(12) United States Patent
Männikkö

(10) Patent No.: US 6,913,434 B1
(45) Date of Patent: Jul. 5, 2005

(54) APPARATUS FOR HANDLING BUNDLES OF BOARDS AND A SUPPORT BED FOR USE IN SUCH AN APPARATUS

(75) Inventor: Ari Männikkö, Nastola (FI)

(73) Assignee: Valmet Panelboard Oy, Nastola (FI)

( * ) Notice: Subject to any disclaimer, the term of this patent is extended or adjusted under 35 U.S.C. 154(b) by 0 days.

(21) Appl. No.: 09/743,184

(22) PCT Filed: Jun. 23, 1999

(86) PCT No.: PCT/FI99/00554

§ 371 (c)(1),
(2), (4) Date: Mar. 7, 2001

(87) PCT Pub. No.: WO00/01609

PCT Pub. Date: Jan. 13, 2000

(30) Foreign Application Priority Data

Jul. 7, 1998 (FI) .................................... 981566

(51) Int. Cl.[7] ............................................ B65G 63/00
(52) U.S. Cl. .................. 414/802; 414/459; 414/416.01
(58) Field of Search ........................... 414/459, 792.4, 414/416.01; 294/81.51, 81.54; 108/51.3, 108/57.25

(56) References Cited

U.S. PATENT DOCUMENTS

| | | | | |
|---|---|---|---|---|
| 3,792,891 A | * | 2/1974 | Kasper et al. ............ 294/81.51 |
| 4,431,359 A | * | 2/1984 | Toniolo .................... 414/139.9 |
| 4,432,690 A | | 2/1984 | Monk | |
| 4,551,059 A | * | 11/1985 | Petoia ........................ 414/459 |
| 4,702,008 A | * | 10/1987 | Suzuki et al. ................. 33/1 T |
| 4,976,336 A | * | 12/1990 | Curran ........................ 187/8.5 |
| 5,088,783 A | * | 2/1992 | Squires .................... 294/81.54 |
| 5,492,067 A | * | 2/1996 | Anderson ................ 105/163.2 |
| 5,645,392 A | * | 7/1997 | Leichty et al. .......... 414/416.01 |
| 5,836,254 A | * | 11/1998 | Johansson .................. 108/51.3 |
| 5,921,739 A | * | 7/1999 | Keip ...................... 211/126.11 |
| 6,099,240 A | * | 8/2000 | Korhonen et al. .......... 414/459 |

FOREIGN PATENT DOCUMENTS

| | | | |
|---|---|---|---|
| DE | 1961557 | 10/1971 | |
| DE | 2336710 | 2/1975 | |
| EP | 0763497 | 3/1997 | |
| FI | 0455495 A1 * | 6/1991 | ................. 414/459 |
| GB | 1124431 | 8/1968 | |
| JP | 402282196 A * | 11/1990 | ................. 414/459 |
| JP | 404087944 A * | 3/1992 | ................. 108/51.3 |
| WO | 9620121 | 7/1996 | |
| WO | WO 96/20121 * | 7/1996 | ................. 414/459 |

* cited by examiner

*Primary Examiner*—Kathy Matecki
*Assistant Examiner*—Sang Kim
(74) *Attorney, Agent, or Firm*—Birch, Stewart, Kolasch & Birch, LLP

(57) ABSTRACT

The present invention relates to an apparatus for handling strapped units of boards, said apparatus comprising a stacker carrier (5) capable of moving the strapped units (2) placed on a support bed (4) in a storage area into storage stacks and off from said storage stacks, respectively. To the opposite sides of said stacker carrier (5) are adapted lift units (23, 24) adapted so as to be individually movable and arranged to cooperate so as to elevate/lower the strapped units of boards resting on said support bed (4). The invention also concerns a support bed suitable for use in the apparatus.

21 Claims, 4 Drawing Sheets

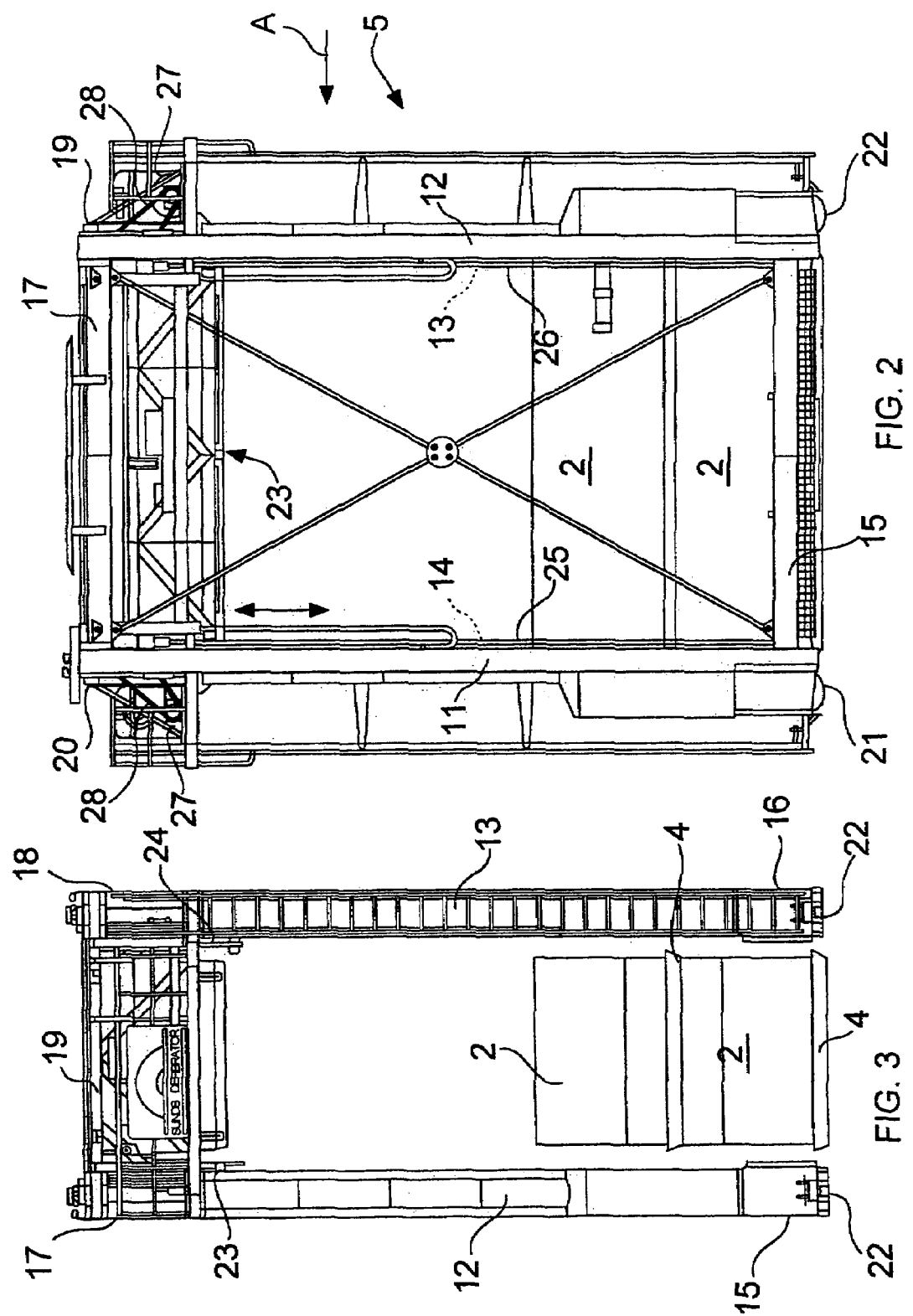

APPARATUS FOR HANDLING BUNDLES OF BOARDS AND A SUPPORT BED FOR USE IN SUCH AN APPARATUS

This application is the national phase under 35 U.S.C. § 371 of PCT International Application No. PCT/FI99/00554 which has an International filing date of Jun. 23, 1999, which designated the United States of America.

BACKGROUND OF THE INVENTION

1. Field of the Invention

The present invention relates to an apparatus for handling bundles of boards and to a support bed therefor.

2. Description of the Related Art

Apparatuses of the type concerned in the invention are used, e.g., in the storage systems of various board products. One such apparatus is described in WO 96/20121. The apparatus includes a storage area in which units of stacked bundles are stored. The end-to-end stored stacks of units form a storage row. The number of successive stacks in a storage row, as well as the number of parallel storage rows, may be varied as required. The units are stacked on a support bed or a pallet. A stacker carrier is arranged to move the stacked units and their support beds in the storage area. The stacker carrier is of a so-called lukki-type straddle carrier in which the unit to be lifted and transferred is held between the high-rise legs of the straddle carrier chassis. The straddle carrier is adapted to move along a track of rails. The straddle carrier includes a lift device suited for moving the stacked units of boards with their support beds to the storage stacks and away therefrom. The lift device of the straddle carrier includes grip members, or grabbers, connected to each other at their upper ends by transverse beams. Due to the structure of the lift device and other accessories, this straddle carrier embodiment of a conventional construction needs substantial extra space about its upper end. Moreover, the construction of the lift device allows the straddle carrier when unloaded to be elevated to its desired operating height only at its target location.

BRIEF SUMMARY OF THE INVENTION

It is an object of the present invention to provide a stacker carrier with a novel type of construction capable of overcoming the disadvantages of conventional techniques.

The invention is principally characterized by lift units adapted to the opposite sides of the stacker carrier, said lift units being individually movable and arranged to cooperate so as to elevate/lower the units of boards resting on a support bed.

More specifically, the invention is characterized by what is stated in the appended claims.

The arrangement according to the invention has a number of significant benefits. The space required by the apparatus has been reduced substantially. The combination according to the invention of a support bed with cooperating grip members provides a construction which is superior to the prior art in simplicity and reliability. The stacker carrier according to the invention offers a more efficient utilization of a storage area. Moreover, the construction costs of the apparatus are reduced. The operating speed of the apparatus has been improved inasmuch as the unloaded grip members can be moved in the vertical direction during the travel of the stacker carrier unhindered by the board stacks resting in the storage area. As a result, a storage capacity vastly greater than that available in the prior art is attained.

BRIEF DESCRIPTION OF THE DRAWINGS

In the following, the invention will be examined in more detail with the help of an example by making reference to the attached drawings in which

FIG. 2 shows an embodiment of the apparatus according to the invention in a side view;

FIG. 3 shows an apparatus according to the invention viewed from the direction of arrow A in FIG. 2;

DETAILED DESCRIPTION OF THE PREFERRED EMBODIMENTS

Figure 1:
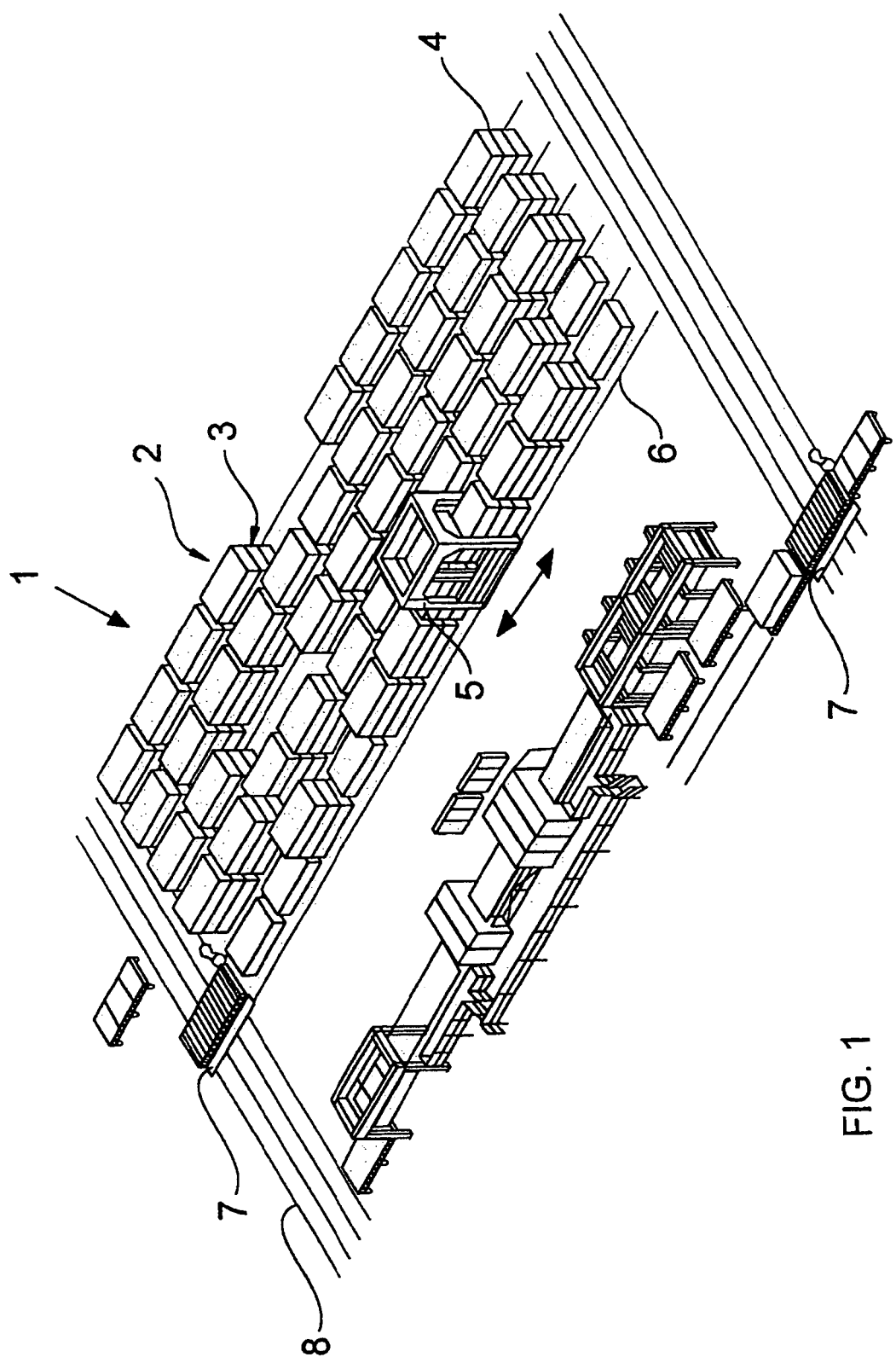
FIG. 1 shows an embodiment utilizing an apparatus according to the invention.

In FIG. 1 is shown an embodiment suitable for utilizing an apparatus according to the invention. The embodiment comprises a storage area 1 in which stacked units 2 of boards are stored in stacks. The successive board stacks 3 form a storage row. The number of successive stacks of units in a row, as well as the number of parallel storage rows, may be varied as required. The stacked units 2 are stacked on a support bed 4, referred to below as a "pallet". Transfer of the units 2 and the pallets 4 in the storage is arranged by means of a stacker carrier 5. The stacker carrier 5 is advantageously of the wheeled straddle carrier type also known as a lukki carrier, whereby the stacked unit to be lifted and transferred is moved elevated between the high-rise wheeled legs of the stacker carrier. The stacker carrier is arranged to move along a track 6 formed by, e.g., rails with the help of conventional drive means. The stacker carrier 5 is equipped with a lift device capable of moving the units with their pallets into the storage stacks 3 and off the storage stacks, respectively. Each storage row is situated between a pair of adjacent rails 6 forming a track, whereby the storage row is laid between the wheeled legs of the stacker carrier. The storage system further includes a unit handling arrangement 7. This unit handling arrangement is provided with transfer means for receiving a stacked unit 2 from e.g., the board manufacturing lines and forwarding the same to further handling.

The invention disclosed in the present application is particularly related to a stacker carrier 5 and a pallet 4 cooperating with the same. The stacker carrier is illustrated in FIGS. 2 and 3. The diagrams also show two units stacked on each other. The stacker carrier comprises a chassis having essentially upright columnar legs 11, 12, 13, 14 connected respectively to each other at their lower ends by bracing beams 15, 16 running parallel to the travel direction of the carrier, and further at their upper ends, by bracing beams 17, 18 running parallel to the travel direction of the carrier as well as by transverse bracing beams 19, 20 oriented crosswise to the travel direction of the carrier. The stacker carrier is equipped with transfer means such as wheels 21, 22 that are driven by conventional drive means (not shown). The stacker carrier further includes a lift device comprising a first lift unit 23 adapted to operate in conjunction with the pair of columnar legs 11, 12 of the stacker carrier that are located on a first side of the storage row and a second lift unit 24 adapted to operate in conjunction with the pair of columnar legs 13, 14 of the stacker carrier that are located on a second side of the storage row. In the embodiment shown in the diagrams, the lift units 23, 24 are arranged to move between their respective pair of columnar legs, possibly supported by said legs. Obviously, the stacker carrier has means for elevating and lowering said lift units. Said means for elevating/lowering each lift unit separately may be implemented, e.g., comprising at least one drive shaft and at least one lift means 25, 26 such as a lift chain, belt or cable that is connected by its first end, e.g., to said drive shaft and by its second end to the body of the lift unit or, alternatively, is passed to the drive shaft and/or the lift unit. In the embodiment illustrated in the diagram, the lift means comprise chains 25, 26 having their both ends connected to said lift unit 23, whereby the drive shaft located at the upper part of said lift unit is provided with a drive sprocket for either chain and the lower part of the lift unit is respectively provided with an idler sprocket over which the chain is passed. Each of the lift units are arranged to be actuated by both ends with the help of separate lift means. Typically, there is adapted one lift means per each end of the lift unit. The drive shafts are adapted driven by a drive unit 27, advantageously equipped with a reduction 28. The drive unit 27 may be an electric motor, for instance, such as a squirrel-cage motor. As the drive shafts are mounted in a conventional manner in bearings adapted to the body of the lift device, this system is prior art well known to a skilled person and thus needing no further discussion herein.

The apparatus according to the invention is principally characterized by lift units 23, 24 adapted to the opposite sides of the stacker carrier, said lift units being individually movable and arranged to cooperate so as to elevate/lower the stacked units of boards resting on a support bed 4. The lift unit 23, 24 includes load support members 31 and, respectively, the support bed 4 includes mating members 53 for locking the support bed 4 to the lift units 23, 24 at least for the duration of a lifting operation. The load support members 31 and the mating members 53, 54 are provided with interlocking mating shapes. For this purpose, the load support members 31 may be provided with, e.g., a bracket part 32 extending at a right angle in the horizontal plane during the lifting operation.

In the embodiment shown in the diagrams, each lift unit is actuated by two drive shafts on which are arranged lift chains 25, 26 serving to elevate and lower the lift unit 23, 24. The rotation of the drive shafts is arranged to take place by means of, e.g., a drive unit 27 equipped with a variable-frequency inverter and an angular pulse encoder or a similar position transducer. Thus, the drive shafts can be driven with an extremely high positional accuracy. When the number of the drive units is greater than one, the first one of the drive units can be a so-called master drive unit while the others are so-called slave drive units. Then, the slave units follow accurately the movements of the master unit based, e.g., on the control signals obtained from the angular pulse encoders, thus assuring that the horizontal positions of the lift units 23, 24 remain extremely well synchronized in the same plane. Additionally, this arrangement eliminates deviations in the positions of the lift units 23, 24 from a horizontal plane under an unbalanced load.

Figure 4:
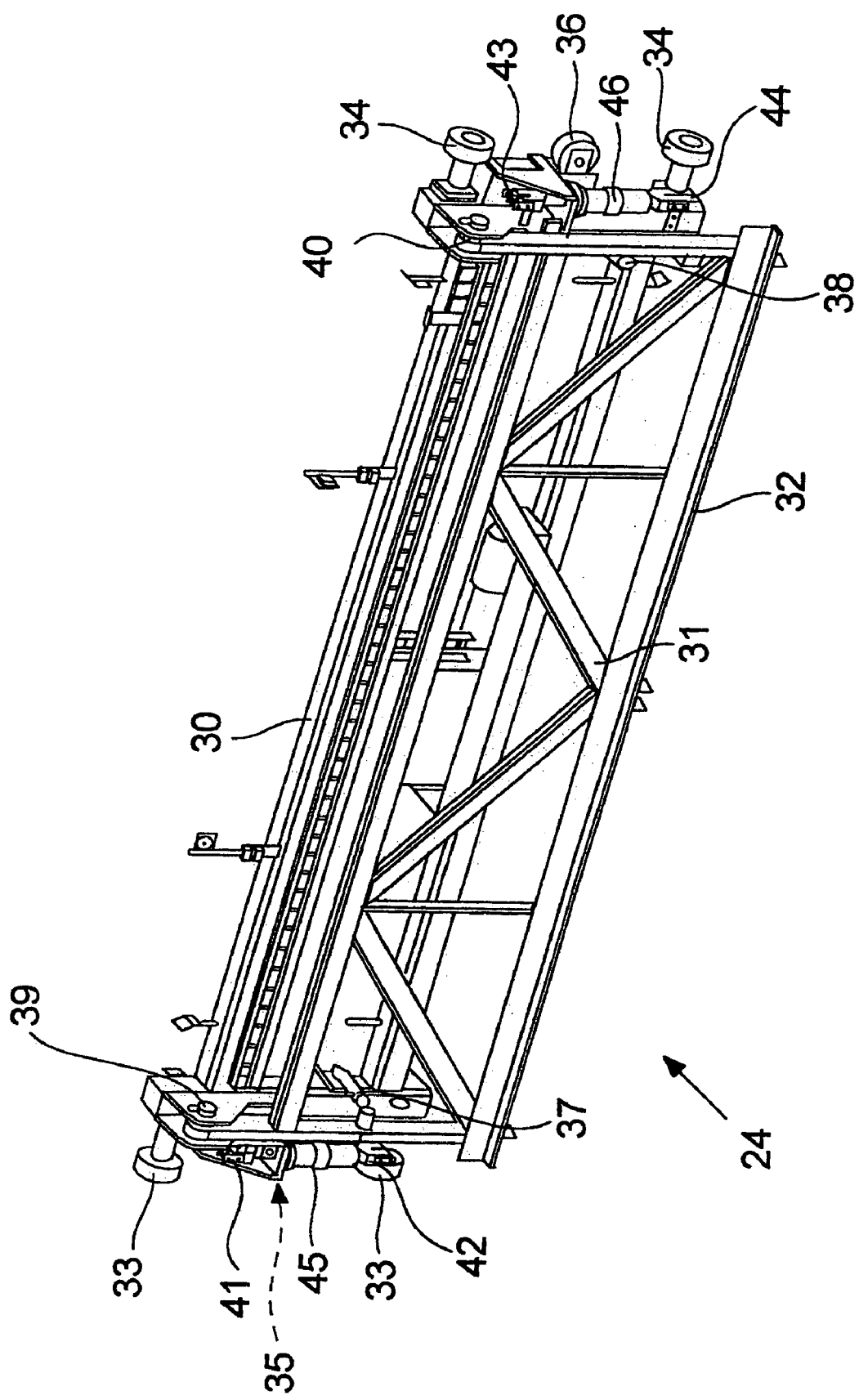
FIG. 4 shows an embodiment of the lift device used in the apparatus.
Figure 5:
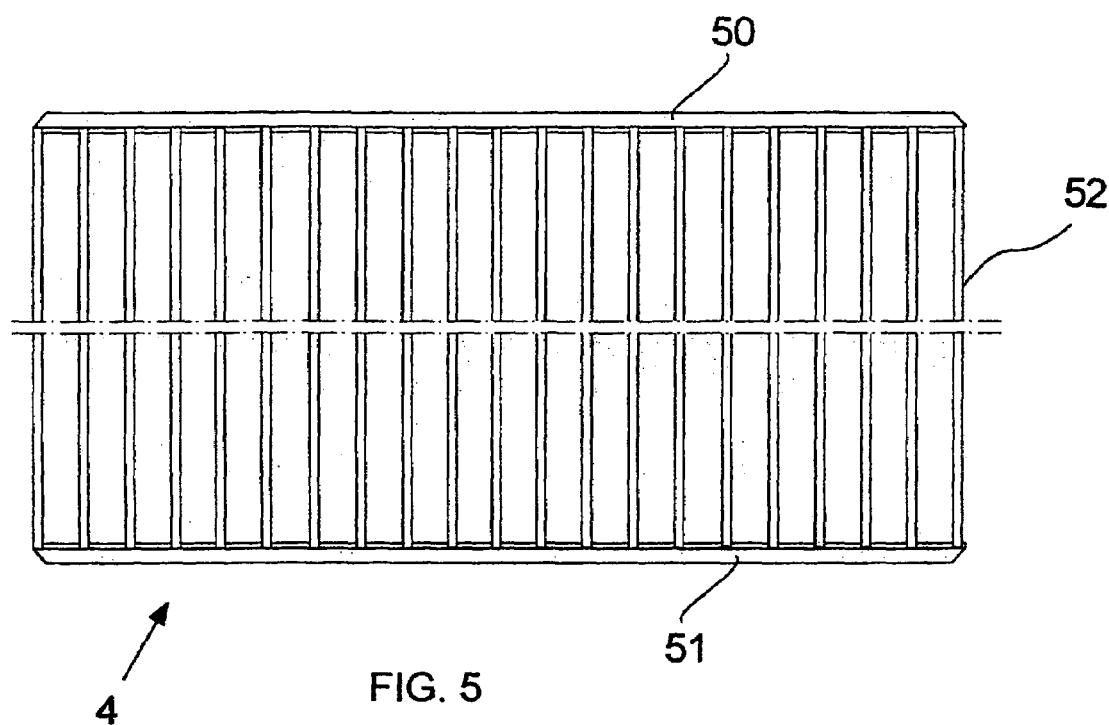
FIG. 5 shows an embodiment of the support bed used in the apparatus.
Figure 6:
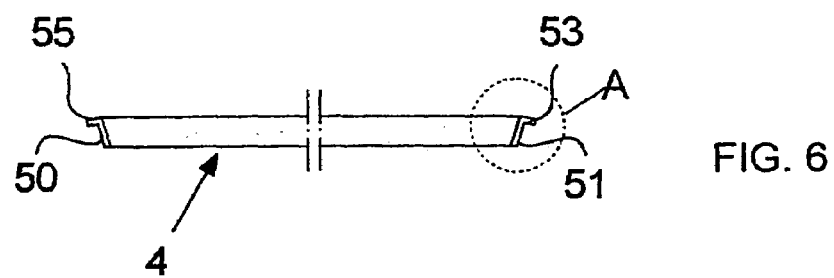
FIG. 6 shows a support bed used in the apparatus in an end view.
Figure 7:
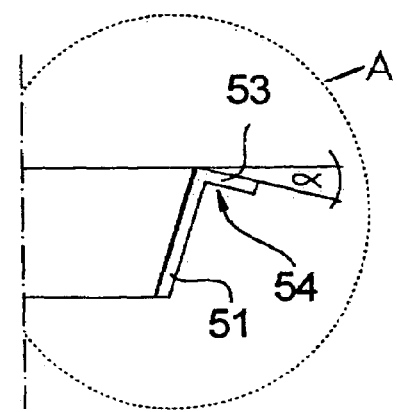
FIG. 7 shows detail A of FIG. 6.

An embodiment of the lift unit 24 of the apparatus according to the invention is shown in FIG. 4. The lift unit comprises a body part 30 having a support member 31 rotatably adapted thereon with at least one support surface 32 resting on a backing surface of the support bed 4. To the opposite ends of the body part 31 are arranged roller members 33, 34, 35, 36 adapted to run on backing surfaces of the columnar legs 11, 12, 13, 14 of the stacker carrier. The stacker carrier further includes means 37, 38 for moving said support member at least between the transfer position and the home position of the support bed. Said means for moving said support member may comprise, e.g., a pneumatic actuator 37, 38 such as a pneumatic cylinder. The support member 31 is mounted at its upper part to the body part 30 of the lift unit pivotally rotatable about a shaft 39, 40. By virtue of the pneumatic cylinder units 37, 38, the support member 31 is made to perform a movement which brings the support surface 32 of the support member under the corresponding backing surface of the support bed 4. The lift unit is further provided with attachments 41, 42, 43, 44 for a hoisting element such as a hoisting chain. The embodiment of the lift unit shown in the diagrams is additionally equipped with a levelling system using actuator cylinder units 45, 46 at either end of the lift unit 23, 24, thus permitting the tilting of the lift units if so required.

According to a preferred embodiment, the support bed 4, or support pallet, is formed from two longitudinal support beams 50, 51 having a plurality of transverse braces 52 placed therebetween. The longitudinal support beams 50, 51 are shaped or complemented to include protruding brackets 53 to which the support surface 32 of the support member 31 of the lift unit of the stacker carrier 5 can be locked. The support bed has a ladder construction. The transverse braces 52 form a support structure under the strapped units of boards resting thereon. Advantageously, the support bed 4 is made slightly larger or equal to the maximum dimensions of the largest board in production. Then, a number of smaller units can be placed adjacent to each other on a single support bed. At least two opposite edges 53, 55 of the support bed, or pallet, are shaped into backing surfaces 54 capable of mating with the gripping support surfaces 32, or grip means, of the support members of the lift units 23, 24. In the embodiment shown in the diagrams, the protruding bracket edge 53 of the support bed is slanted downward from the horizontal plane by an angle α. While the angle α may be varied in a wide range according to the needs of specific embodiment, in the embodiment illustrated in the diagrams the angle is from 5° to 30°, typically from 10° to 15°.

The stacker carrier 5 is typically provided with means (not shown in the diagrams) for locating the support bed. Said locating means include sensor devices such as photocells adapted to the support members, or grip means 23, 24 of the lift unit of the stacker carrier and cooperating elements such as reflective surfaces adapted on the support bed 4. The grip members 23, 24 grip the support bed 4 at least by two bracket edges 53, 54 shaped to the opposite sides of the bed. Additionally, the grip members are provided with conventional elements securing the hold of the grip members on the support bed. Such securing means include, among others, inductive limit position sensors and pressure gages required in the actuator system operating with a pressurized medium. In the arrangement according to the invention based the cooperation of a purpose-designed support bed with mating lift units, there is no need to maintain a continuous pressure of the support members of the lift units against the support bed during lifting and transfer operation, because the support members are arranged to lock on the support bed. Thereby, undesirable forces are prevented from being imposed on the external constructions such as the chassis of the stacker carrier.

To those versed in the art it is obvious that the invention is not limited by the exemplifying embodiments described above, but rather, can be varied within the scope and spirit of the appended claims.

What is claimed is:

1. An apparatus for handling stacked units of boards comprising:
   a stacker carrier capable of moving a plurality of stacked units placed on a support bed in a storage area into storage stacks and off from said storage stacks, respectively, the stacker carrier having a chassis with four upright columnar legs, and a pair of lift units each extending between a pair of the upright columnar legs on opposite sides of said stacker carrier, each of said lift units including:
      a load support member extending lengthwise along substantially a full length of each of the lift units, ends of the load support member being rotatably mounted on pivot shafts adjacent to the upright columnar legs, the load support members being individually movable and arranged to cooperate so as to elevate/lower the stacked units of boards resting on said support bed; and,
      actuators mounted on each of the lift units for enabling the load support members of the lift units to rotate about the pivot shafts between a transfer position and a home position.

2. An apparatus according to claim 1, wherein the support bed includes mating members for locking the support bed to the lift units at least for the duration of a lifting operation.

3. An apparatus according to claim 1, wherein said load support members and said mating members are provided with interlocking mating shapes.

4. An apparatus according to claim 1, wherein each of said support members is provided with a protruding part forming an angle with the horizontal plane during the lifting operation.

5. An apparatus according to claim 1, wherein each of said lift units is actuated by two drive shafts driving a plurality of lift elements, said plurality of lift elements being a plurality of lift chains, and wherein said drive shafts are arranged to be driven by at least one drive unit equipped with a variable-frequency inverter and an angular pulse encoder or a similar position transducer.

6. An apparatus according to claim 1, wherein said lift units are equipped with at least one drive unit, and when the number of drive units is larger than one, the first one of said drive units is a so-called master drive unit, and the others are so-called slave drive units.

7. A support bed according to claim 1, wherein at least two opposite edges of the support bed are provided with mating members capable of locking said support members of said lift units to said support bed.

8. A support bed according to claim 1, wherein said mating members of said support bed are formed by bracket edges slanted downward by an angle from the horizontal plane.

9. An apparatus according to claim 2, wherein said load support members and said mating members are provided with interlocking mating shapes.

10. An apparatus according to claim 2, wherein each of said support members is provided with a protruding part forming an angle with the horizontal plane during the lifting operation.

11. An apparatus according to claim 3, wherein said each of support members is provided with a protruding part forming an angle with the horizontal plane during the lifting operation.

12. An apparatus according to claim 2, wherein each of said lift units is actuated by two drive shafts driving a plurality of lift elements, and said drive shafts are arranged to be driven by a drive unit equipped with a variable-frequency inverter and an angular pulse encoder or a similar position transducer.

13. An apparatus according to claim 3, wherein each of said lift units is actuated by two drive shafts driving a plurality of lift elements, and said drive shafts are arranged to be driven by a drive unit equipped with a variable-frequency inverter and an angular pulse encoder or a similar position transducer.

14. An apparatus according to claim 4, wherein each of said lift units is actuated by two drive shafts driving a plurality of lift elements, and said drive shafts are arranged to be driven by a drive unit equipped with a variable-frequency inverter and an angular pulse encoder or a similar position transducer.

15. An apparatus according to claim 2, wherein said lift units are equipped with at least one drive unit, and when the number of said drive units is larger than one, the first one of said drive units is a so-called master drive unit and the others are so-called slave drive units.

16. An apparatus according to claim 3, wherein said lift units are equipped with at least one drive unit, and when the number of said drive units is larger than one, the first one of said drive units is a so-called master drive unit and the others are so-called slave drive units.

17. An apparatus according to claim 4, wherein said lift units are equipped with at least one drive unit, and when the number of said drive units is larger than one, the first one of said drive units is a so-called master drive unit and the others are so-called slave drive units.

18. An apparatus according to claim 5, wherein when the number of said drive units is larger than one, the first one of said drive units is a so-called master drive unit and the others are so-called slave drive units.

19. An apparatus according to claim 12, wherein said plurality of lift elements is a plurality of lift chains.

20. An apparatus according to claim 1, wherein the lift units further comprise roller members adapted to run on columnar legs.

21. An apparatus for handling stacked units of boards comprising
   a stacker carrier capable of moving a plurality of stacked units placed on a support bed in a storage area into storage stacks and off from said storage stacks, respectively, the stacker carrier having a chassis with four upright columnar legs, and a pair of lift units each extending between a pair of the upright columnar legs on opposite sides of said stacker carrier, each of said lift units including:
      a pair of pivot shafts disposed at upper end portions of each of the lift units adjacent to the upright columnar legs;
      a load support member being rotatably mounted on each of the pairs of pivot shafts and being individually movable and arranged to cooperate for elevating/lowering the stacked units of boards resting on the support bed;
      a pair of actuators mounted on each of the lift units for enabling the load support members to rotate about the pair of pivot shafts between a transfer position and a home position; and
      a first roller member and a second roller member provided at each end of the lift units adjacent to the pair of pivot shafts, the first and the second roller members adapted to run up and down on two different surfaces of the columnar legs of the apparatus.

* * * * *